United States Patent
Mao

(10) Patent No.: US 10,348,176 B2
(45) Date of Patent: Jul. 9, 2019

(54) VIBRATION MOTOR

(71) Applicant: AAC Technologies Pte. Ltd., Singapore (SG)

(72) Inventor: Lubin Mao, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 100 days.

(21) Appl. No.: 15/831,836

(22) Filed: Dec. 5, 2017

(65) Prior Publication Data

US 2018/0342937 A1 Nov. 29, 2018

(30) Foreign Application Priority Data

May 26, 2017 (CN) .................. 2017 2 0607546 U

(51) Int. Cl.
*H02K 33/00* (2006.01)
*H02K 35/00* (2006.01)
*H02K 33/02* (2006.01)
*H02K 33/16* (2006.01)

(52) U.S. Cl.
CPC ............ *H02K 33/02* (2013.01); *H02K 33/16* (2013.01)

(58) Field of Classification Search
CPC ................................ H02K 33/02; H02K 33/16
USPC ..................................................... 310/25, 15
See application file for complete search history.

(56) References Cited

U.S. PATENT DOCUMENTS

| | | | | |
|---|---|---|---|---|
| 8,624,450 B2* | 1/2014 | Dong | ................... | H02K 33/16 310/15 |
| 8,682,396 B2* | 3/2014 | Yang | ..................... | B06B 1/045 310/12.04 |
| 8,878,401 B2* | 11/2014 | Lee | ....................... | H02K 33/16 310/15 |
| 2011/0018364 A1* | 1/2011 | Kim | ..................... | H02K 33/18 310/17 |
| 2012/0049660 A1* | 3/2012 | Park | ..................... | B06B 1/045 310/25 |
| 2013/0076178 A1* | 3/2013 | Kuroda | ................ | H02K 33/00 310/81 |
| 2015/0137627 A1* | 5/2015 | Katada | ................ | H02K 33/16 310/25 |

* cited by examiner

*Primary Examiner* — Yuriy Semenenko
(74) *Attorney, Agent, or Firm* — Na Xu; IPro, PLLC

(57) ABSTRACT

A vibration motor includes a housing; a stator; an vibrator accommodated in the housing; an elastic piece suspending the vibrator in the housing; a protrusion protruding along the center axis from the hole wall of the accommodation hole and formed at a position on the mass block corresponding to and fit with the bending structure; at least two magnets fixed on one side of the first side walls far from the hole wall of the accommodation hole. The vibrator includes a mass block with an accommodation hole, a center axis passing through a geometrical center thereof along a vibration direction of the vibrator; and a yoke disposed along a hole wall of the accommodation hole. The yoke includes a first side wall, a second side wall, and bending structures.

9 Claims, 5 Drawing Sheets

VIBRATION MOTOR

FIELD OF THE PRESENT DISCLOSURE

The present disclosure relates to a vibration motor for providing tactile feedbacks.

DESCRIPTION OF RELATED ART

With the arrival of mobile internet era, the number of intelligent mobile devices is on the increase. While among so many mobile devices, mobile phone is undoubtedly the most common and portable mobile device. Currently, mobile phone has a great variety of functions including but not limited to high-quality music function, and a vibration motor driving a screen to sound in the mobile phone is one of the necessary conditions for achieving such high-quality music function.

Generally, the vibration motor comprises a vibrator and a stator, both of which have a magnetic circuit structure and a coil provided therein, vibrating under electromagnetic action. The vibration motor of prior art has an inferior rate of space utilization.

Therefore it is necessary to provide an improved vibration motor for overcoming the above-mentioned disadvantages.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
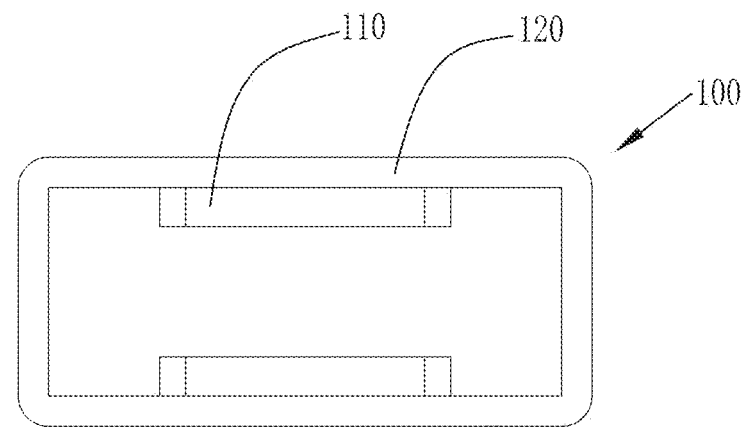
FIG. 1 is an illustration of a magnetic circuit of a related art.

As shown in FIG. 1, in the structure of the vibrator 100 of a prior art, the magnet 110 has a length less than the yoke 120, while the yoke 120 affixed with the magnet 110 is in a planar structure, both ends of the magnet 110 is at a relatively far distance from the yoke 120, thus resulting in waste of space where four corners of the yoke 120 and the magnet 110 are located.

According to the present disclosure, the four corners of the yoke 120 are bent inward, thus allowing the space of the four corners that would have be wasted to be increased as a mass block. With unchanged driving force of the magnetic circuit, it has a relatively good rate of space utilization, the mass block weight increases to improve vibration sense.

Figure 2:
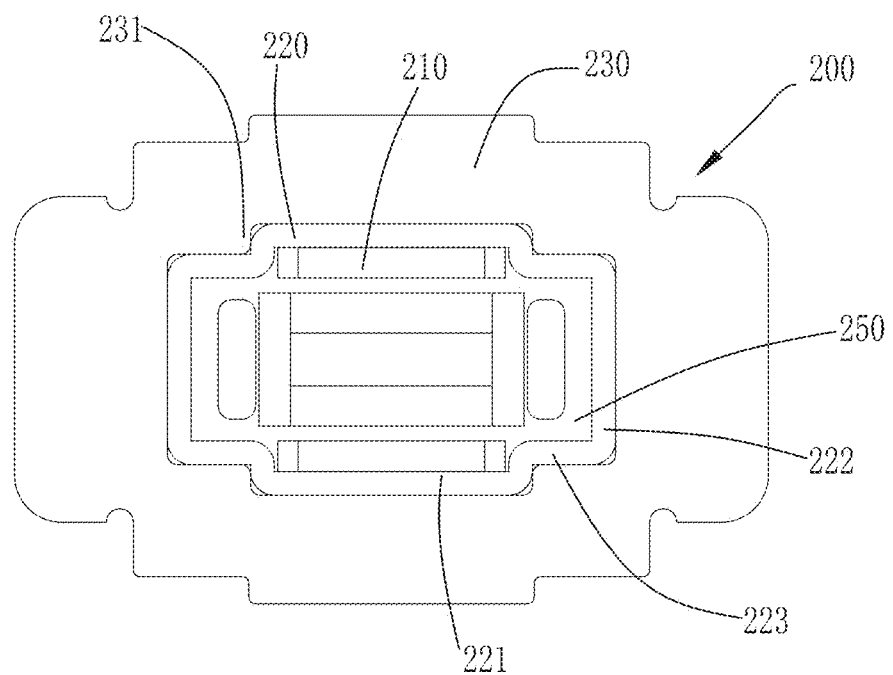
FIG. 2 is an illustration of a vibrator of a vibration motor in accordance with an exemplary embodiment of the present disclosure.
Figure 3:
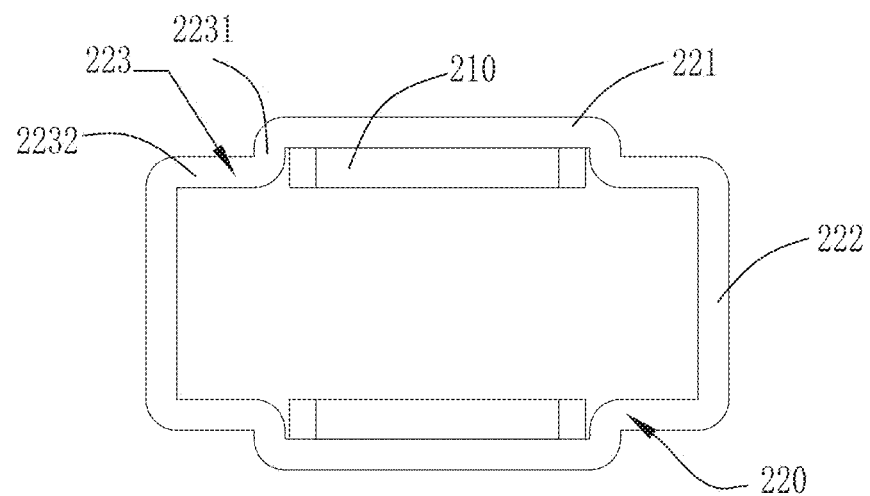
FIG. 3 is an illustration of an exemplary assembly of a yoke and a magnet.

FIGS. 2-3 shows a vibrator 200 of an embodiment according to the present disclosure. The vibrator 200 comprises magnets 210, a yoke 220 and a mass block 230 provided in an order from inside to outside. Wherein, the mass block 230 has an accommodation hole (not numbered) opened therein, and further comprises a center axis passing through a geometrical center of the mass block 230 and provided along a vibration direction of the vibrator 200. The yoke 220 is provided along the hole wall of the accommodation hole and further fixed on the hole wall of the accommodation hole.

FIG. 2-3 shows a specific assembly structure of the yoke and the magnet. Specifically as shown in FIGS. 2-3, the yoke 220 generally comprises first side walls 221 and second side walls 222 provided at an angle to the first side walls 221. In this embodiment, the yoke 220 is generally shaped as a rectangle, and comprises two first side walls 221 provided spaced apart and two second side walls 222 provided on both sides of the first side walls 221. And each of the first side walls 221 has magnets 210 fixed on it. Of course, in other embodiments, the magnetic 220 can also take other shapes such as hexagon or octagon. The present disclosure has no specific limit to the structure of the yoke 220.

Wherein, the first side walls 221 is in a planar structure or alternatively a curved structure; the magnet 210 has a shape fit with the first side walls 221, so as to allow the magnet 210 affixed with the surface of the first side walls 221. In this embodiment, the first side walls 22 are planar.

Further, the yoke 220 also comprises bending portions 223 extending along a direction toward the center axis from the first side walls 221 and connected to the second side walls 222. In this embodiment, the bending portions 223 is provided between each of the first side walls 221 and the adjacent second side walls 222 on both sides of it. Correspondingly, a protrusion 231 provided as protruded along the direction toward the center axis from the hole wall of the accommodation hole is formed at a position on the mass block 230 corresponding to the bending portions 223. And the protrusion 231 is fit with the bending portions 223. In this embodiment, the protrusion 231 abuts against the bending portions 223. By filling up the space of the bending portions 223 with the protrusion 231 in the mass block 230, the mass of the mass block 230 is increased, thus intensifying the vibration sense of the vibrator.

FIG. 3 further shows a specific structure of the bending portions 223. Further as shown in FIG. 3, in the embodiment of the vibrator 200 according to the present disclosure, the bending portion 223 comprises a first bending parts 2231 formed by bending along the direction toward the center axis from the first side walls 221 and a second bending part 2232 connecting the first bending parts 2231 and the second side walls 222. The magnets are located between the two first bending parts 2231 on both sides of the first side walls 2212, and the magnets 210 have a length less than or equal to a distance between the two first bending portions 2231 on both sides of the first side walls 2212.

Wherein, an end face of the second bending part 2232 close to the center axis is flush with an end face of the magnets 210 close to the center axis, making a space in the yoke 220 an integral and normal space to facilitate later installation and utilization.

Furthermore, in this embodiment, the yoke 220 can be an integrally molded structure, i.e., the first side walls 221, the second side walls 222 and the bending portions 223 are molded integrally. Thus, the yoke 220 is molded in a simple and convenient way.

Figure 4:
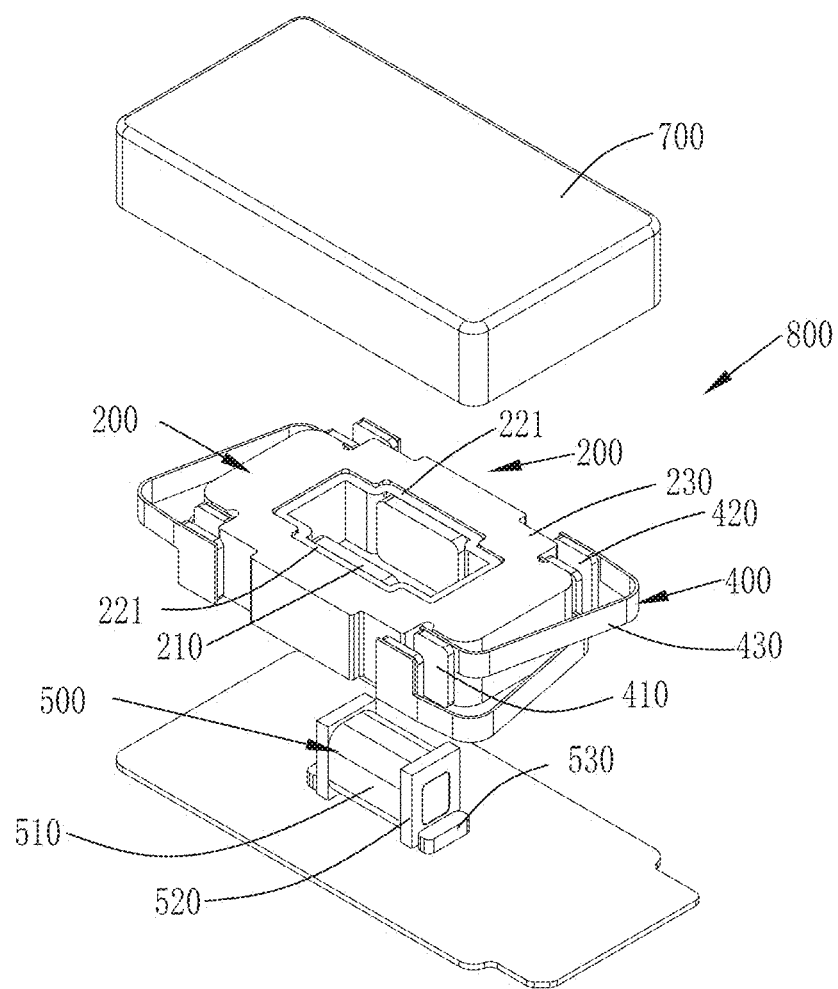
FIG. 4 is an exploded view of a vibrator motor using the vibrator as shown in FIG. 2.

FIG. 4 shows a vibration motor 800. As shown in FIG. 4, the vibration motor 800 comprises a housing 700, a vibrator 200 and a stator 500 accommodated in the housing, and an elastic piece 400 suspending the vibrator in the housing 700. In this embodiment, the stator 500 comprises a coil 510, a pole piece 520 and stoppers 530, the coil 510 is provided as inserted inside the yoke 220, and the coil 510 is provided between two magnets 210. The pole piece 520 is provided as inserted inside the coil 510. The stoppers 530 are provided at both ends of the pole piece 510, and fixed on the housing 700 to limit the move of the pole piece 520.

Figure 5:
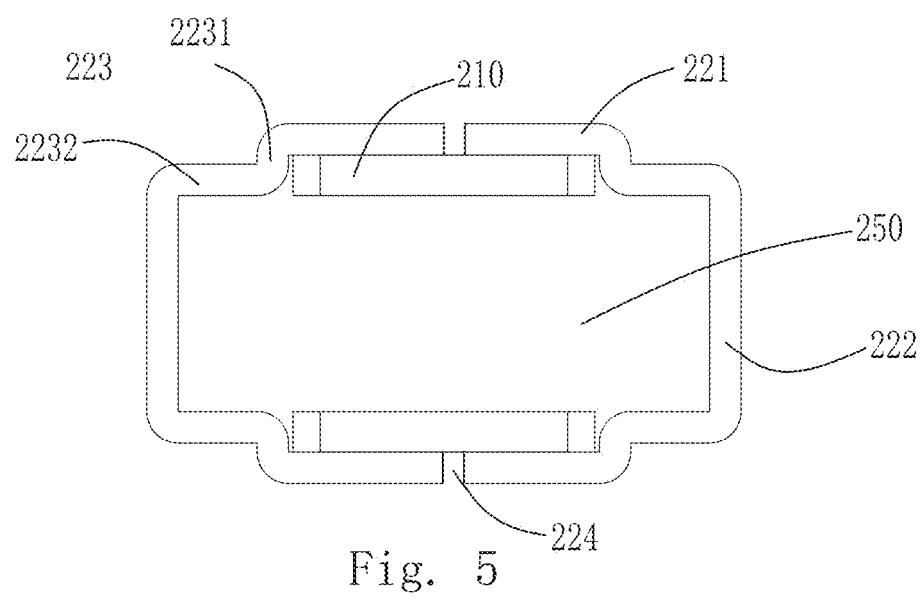
FIG. 5 is an illustration of another exemplary assembly of a yoke and a magnet.

FIG. 5 shows an assembly structure of the yoke and magnets of the vibrator of another embodiment according to the present disclosure. As shown in FIG. 5, the yoke 220 can also be provided as a separated structure. In this embodiment, it allows to be disconnected separately on the first side walls 221 and/or the second side walls 222, thus making the first side walls 221 and/or the second side walls 222 comprise at least two portions separated from each other. By separated disposition, it's easy for molding and installation of the yoke 220.

In this embodiment, as shown in FIG. 5, specifically the first side walls 221 is disconnected to form a gap 224. The disconnection is located within an area of contact between the magnet 210 and the first side walls 221, so as to ensure no influence on magnetic flux transmission and hence on driving force. Of course, the separated structure can also be formed through disconnection at other location or on other side walls, and the disconnected side walls 221 can be one or more. During use, the gap 224 shall be filled up with glue, to make all the side walls of the yoke 220 fixed to each other.

Figure 6:
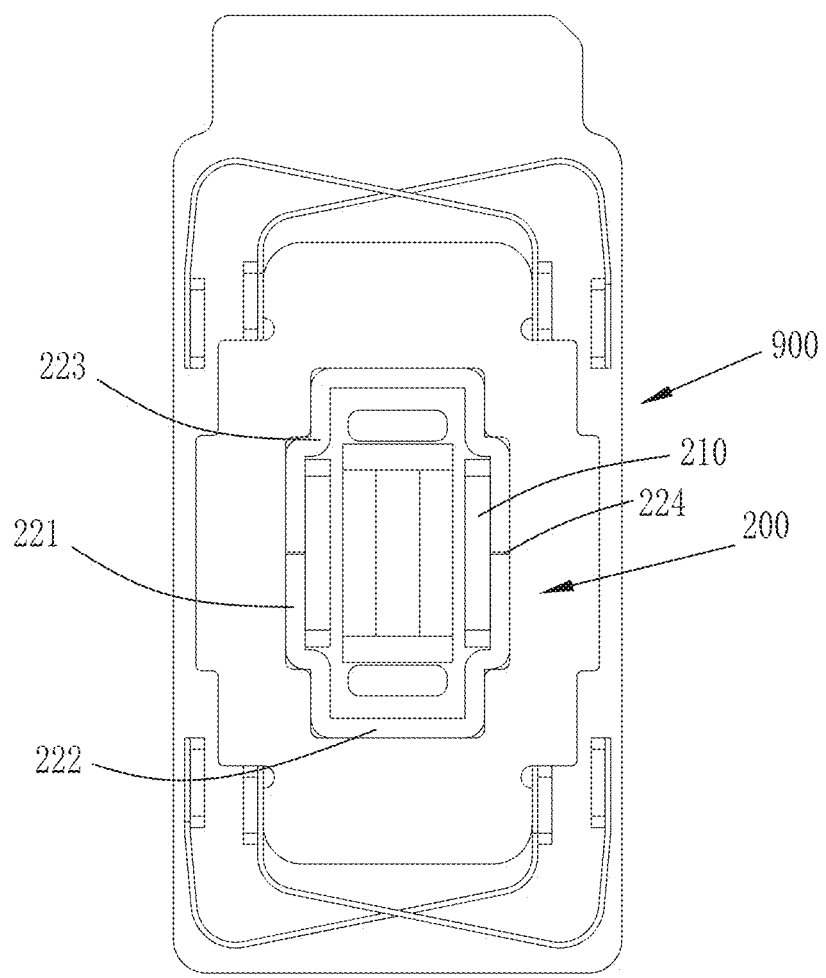
FIG. 6 is an exploded view of a vibrator motor using the vibrator as shown in FIG. 5.

FIG. 6 shows a vibration motor 900. By providing the yoke as a separated structure, i.e. the first side walls and/or the second side walls comprise at least two portions separated from each other, thus facilitate the installation and adjustment of the yoke.

Therefore, according to the present disclosure, by fixing the yoke inside the mass block with the yoke forming bending portions at both ends of the magnets and providing the protrusion at the position on the mass block corresponding to the bending portions, the vibration motor can achieve the best space utilization rate, increased weight of the mass block and improved vibration sense with unchanged driving force of magnet circuit.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor including:
   a housing;
   a stator;
   an vibrator accommodated in the housing, the vibrator including a mass block with an accommodation hole, a center axis passing through a geometrical center thereof along a vibration direction of the vibrator; and a yoke disposed along a hole wall of the accommodation hole, the yoke including a plurality of first side walls, a plurality of second side walls formed an angle relative with the first side walls and bending structures extending along a direction toward the center axis from the first side walls and connected to the second side walls;
   an elastic piece suspending the vibrator in the housing;
   a protrusion protruding along the center axis from the hole wall of the accommodation hole and formed at a position on the mass block corresponding to and fit with the bending structure;
   at least two magnets fixed on one side of the first side walls far from the hole wall of the accommodation hole.

2. The vibration motor as described in claim 1, wherein the bending structures comprise first bending parts bending along the direction toward the center axis from the first side walls and second bending parts connecting the first bending parts and the second side walls.

3. The vibration motor as described in claim 1, wherein the two first side walls are spaced apart and the two second side walls locate on both sides of the first side walls, the bending structures are formed between each of the first side walls and the second side walls on both sides thereof, and the magnets are fixed at each of the first side walls.

4. The vibration motor as described in claim 3, wherein each of the magnets is located between the two the first bending parts on both sides of each of the first side walls, and the magnets have a length less than or equal to a distance between the two first bending structures on both sides of the first side walls.

5. The vibration motor as described in claim 3, wherein an end face of the second bending parts close to the center axis is flush with an end face of the magnets close to the center axis.

6. The vibration motor as described in claim 1, wherein the first side walls, the second side walls and the bending structures are molded integrally.

7. The vibration motor as described in claim 1, wherein the first side walls and/or the second side walls comprise at least two portions separated from each other.

8. The vibration motor as described in claim 3, wherein the stator comprises a coil located between two magnets.

9. The vibration motor as described in claim 8, wherein the stator further comprises a pole piece and stoppers for limiting movement of the pole piece; the stoppers are fixed on the housing.

* * * * *